Aug. 9, 1932.   S. ALSOP   1,870,885
FILTERING APPARATUS
Filed April 20, 1929   2 Sheets-Sheet 1
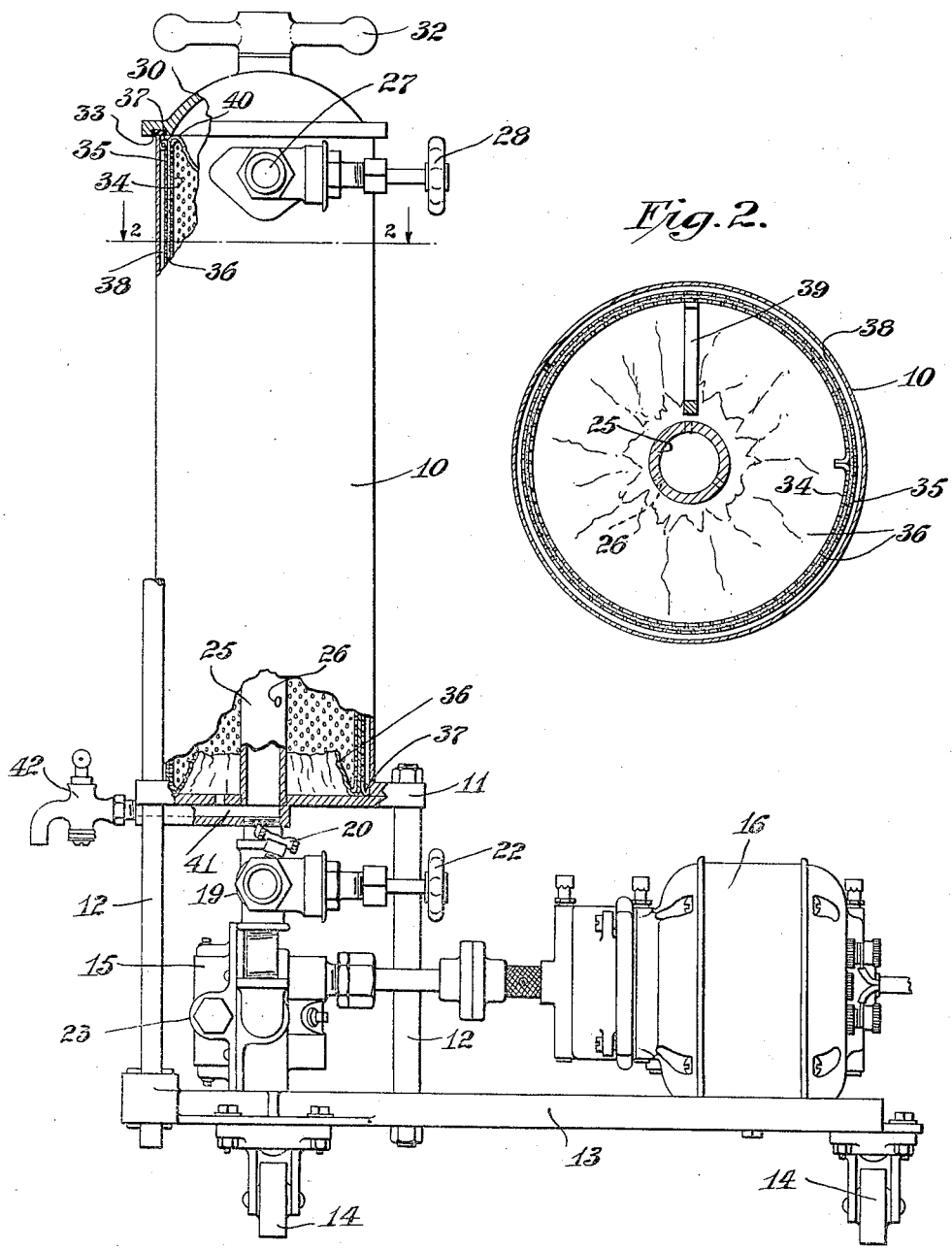
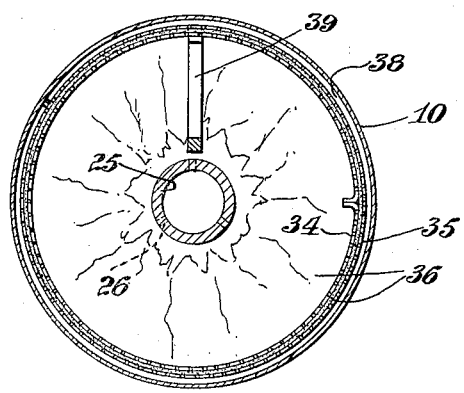

Aug. 9, 1932.  S. ALSOP  1,870,885
FILTERING APPARATUS
Filed April 20, 1929  2 Sheets-Sheet 2
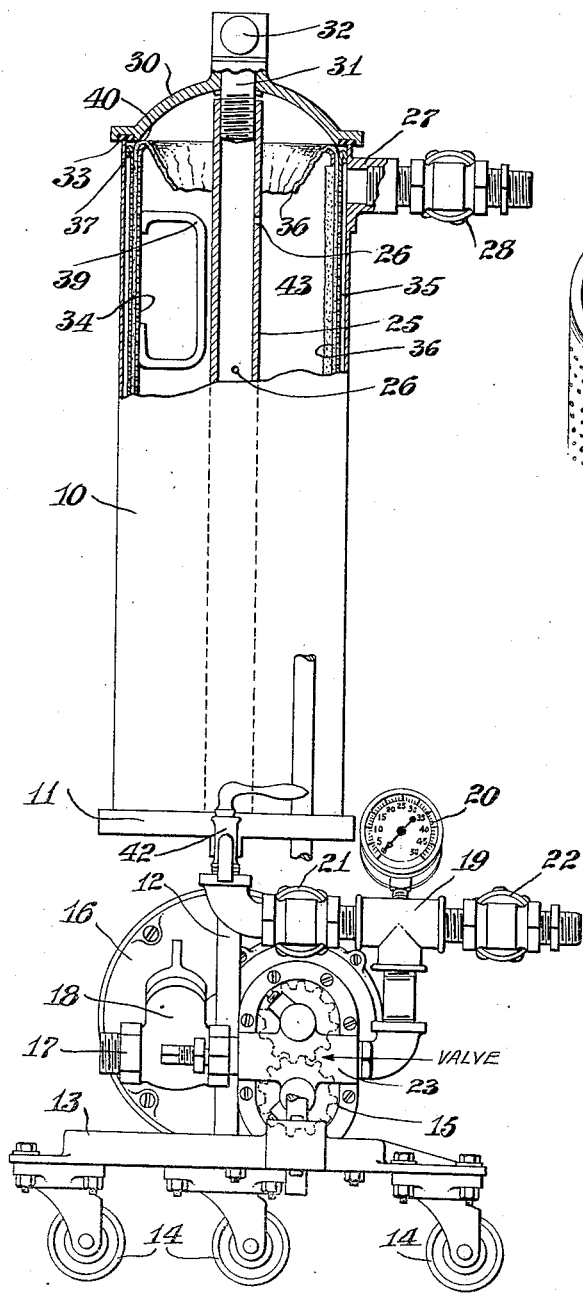
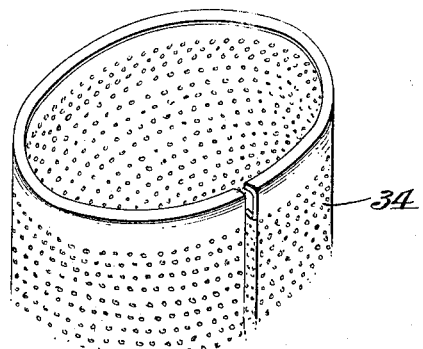
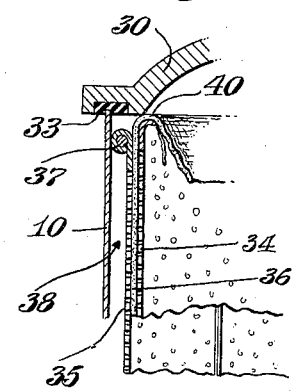
INVENTOR
Samuel Alsop
ATTORNEY Patented Aug. 9, 1932

1,870,885

UNITED STATES PATENT OFFICE

SAMUEL ALSOP, OF NEW YORK, N. Y.

FILTERING APPARATUS

Application filed April 20, 1929. Serial No. 356,758.

My invention relates to apparatus for filtering liquids and particularly apparatus embodying a power operated pump.

One object is to provide a simple but reliable and readily portable apparatus.

Another object is to provide a compact but highly efficient filter.

Another object is to provide apparatus which can be run for a long time without cleaning.

Another object is to provide apparatus which can be readily cleaned.

In the preferred form of apparatus I employ one or more filtering cylinders suitably supported on a platform together with a motor driven circulating pump. Removable filtering screens are provided and the liquid is forced into the center of the cylinder and outwardly through the screens. The screens are held in place by the clamping of the cover. Suitable valves are provided so that the filtering screens can be bypassed when desired.

Figure 1 is side view of apparatus embodying my invention, parts being broken away to show sections of the screens.

Figure 2 is a horizontal section on the plane of the line 2—2 of Figure 1 but on a somewhat larger scale.

Figure 3 is an end view of the apparatus, the upper part being broken away and parts being shown in section.

Figure 4 is a fragmentary perspective view of one of the screens.

Figure 5 is an enlarged fragmentary sectional view showing the relation of the cover to the screens.

The main liquid chamber 10 is preferably of sheet metal and provided with a bottom plate 11 which is supported by pedestals 12 on the platform 13. This platform is preferably provided with casters 14 to facilitate movement.

A suitable circulating pump 15 is provided, driven by an electric motor 16.

The inlet 17 is preferably provided with a strainer member 18 to prevent the entrance of large particles of undesirable material and thus prevent injury to the circulating pump.

A T-pipe section 19 has its upright connected to the outlet of the pump and supports a gage 20 for convenience in indicating the pressure in the pipe. Hand valves 21 and 22 are provided to control the outlet from the T.

A bypass valve 23 is preferably provided extending from the inlet to the outlet side of the pump so that liquid can automatically pass around the pump in case of excessive pressure or interference with the operation of the pump.

The pipe 25 has its lower end supported in the plate 11 and has a number of perforations 26 so that liquid forced through the pipes from the pump is discharged near the center of the main receptacle.

An outlet pipe 27 is secured to the upper end of the cylinder and provided with a hand valve 28.

The cover 30 is secured in place by a bolt or screw member 31 which has a handle 32 and screws into the upper end of the pipe 25. A rubber gasket 33 is also preferably provided to engage the upper edge of the reservoir and provide a liquid tight joint.

The actual filtering is done by an inner screen 34, an outer screen 35 and one or more layers of filtering material 36, such as paper and/or cloth. Each of the screens is preferably formed of a perforated metal sheet which is curved to form a cylinder with its edges abutting against each other when the screens are in place.

These screens are supported in the bottom plate 11 and are quite resilient. The tendency is for these screens to expand, as shown in Figure 4. The outer screen 35 is provided with a bead 37 at each end which serves to space the screen away from the inner wall of the cylinder thus leaving a chamber 38 for the liquid communicating with the outlet pipe 27. The inner screen is provided with a handle 39 to facilitate its removal. A filtering medium paper cloth or the like is wound around the outside of the inner screen which is then inserted inside of the outer screen. The cover engages the upper end 40 of the filtering screens and material to form a tight joint and prevent liquid from leaking around the top of the screens.

The bottom of the cylinder is provided with an outlet passage 41 controlled by a hand valve and faucet 42.

In the normal operation of the apparatus the valve 22 is closed, the valve 21 is open, the faucet 42 is closed and the valve 28 is open so that the pump draws in liquid through the pipe 17 and forces it through the T 19 into the upright pipe 25 inside the screens and filtering medium. The liquid passes through the screens and filtering medium outwardly to the chamber 38 and thence through the outlet 27 past the valve 28. The residue 43 collects on the inside of the screen 34 so that there is maximum room for collection of the residue in a given size device. When the pump has pumped into the filter all the liquid from the tank (not shown) air will be forced into the cylinder and the liquid in the cylinder which has not escaped through the top can then be drawn off by opening the faucet valve 42.

If it is desired to pump liquid without having it pass through the filtering medium the valve 21 is closed and the valve 22 is open.

This construction will be found to include a very much greater filtering area than other structures of the same size. It also provides a very much greater space for the building up of cake or the collecting of dirt before requiring cleaning of the filter. This means that a given size apparatus can be used for a very long time without requiring cleaning.

The construction will also be found to greatly facilitate cleaning the filtering screens when necessary and replacing the filtering medium.

The construction being simple and of small size for a given capacity is very economical.

Various changes in detail of construction may be resorted to without departing from the principle of the invention.

The concentric split screen arrangement provided with the interior handle 39 makes it possible to easily remove the filtering means from the reservoir even though the screens become badly caked. When the two screens with the sediment have been removed from the reservoir the outer screen may be readily sprung apart or expanded and removed, whereupon the filter cloth or paper can be readily removed and access had to the inner screen for cleaning it.

While I have shown and described the reservoir as vertical it should be understood that some of the advantages may be obtained with such a construction mounted horizontally or at an inclination to the horizontal.

It should also be understood that although I prefer to fasten the cover to the inlet pipe 25, it might be fastened in other ways.

It should also be understood that although I prefer to mount the pump as a unit with the reservoir that various advantages might be obtained without the use of the pump.

I also wish it understood that although I have shown only one reservoir with a pump, any number of reservoirs with their filtering means might be employed with each pump.

I claim:

1. A filter element comprising split expansible screens and a sheet of porous flexible filter material between said screens and held contiguous each screen by the opposite screen whereby different thicknesses of filter material may be placed between said screens.

2. A filter comprising a casing, a movable head, a filter element including split expansible screens, a sheet of flexible filter material between said screens, said head being shaped to engage the inner screen and sheet and effect their compression according to the thickness of the filter sheet without having said head compressing the outer screen.

3. A filter comprising a casing, a removable head secured to the casing and provided with an inwardly extending projection, an expansible split screen engaging the filter casing opposite said head, a sheet of filter material folded over the head end of said screen, the end of said screen adjacent said head being inclined longitudinally outward and radially inward of the casing for engagement with said head projection for clamping said screen and sheet in position in the head end of the casing, a second split screen outside the filter sheet and first mentioned screen and shorter than said first mentioned screen and means adjacent said head for spacing the outer screen from the casing wall, said filter sheet being clamped between the two screens, said screens being adapted to accommodate themselves to filter material of different thicknesses.

4. A filter comprising a casing, a removable head secured to the casing, concentric screens within the casing, filter material yieldably clamped by and between said screens, the inner screen being split, means for spacing the outer screen a fixed lateral distance from the casing, the inner screen and head being shaped for the head to engage the filter material at the same height irrespective of the thickness of the filter material and the inner screen being compressed to a smaller diameter when thicker filter material is used.

SAMUEL ALSOP.